Oct. 6, 1942.  W. R. HAINSWORTH  2,297,761
REFRIGERATION
Filed Nov. 14, 1938
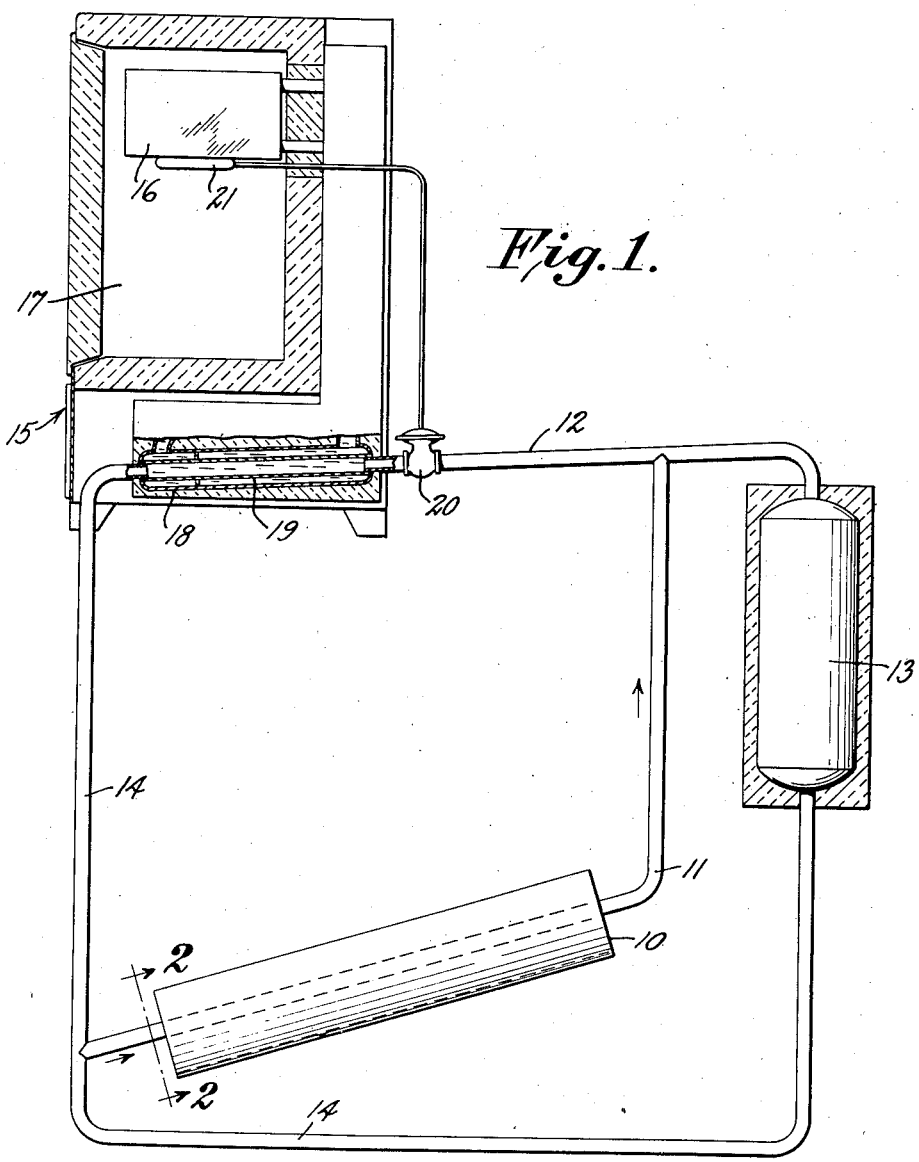
INVENTOR.
William R. Hainsworth
BY
D. E. Heath
ATTORNEY.

Patented Oct. 6, 1942

2,297,761

UNITED STATES PATENT OFFICE 2,297,761

REFRIGERATION

William R. Hainsworth, Larchmont, N. Y., assignor to Servel, Inc., New York, N. Y., a corporation of Delaware Application November 14, 1938, Serial No. 240,270

2 Claims. (Cl. 62—5)

My invention relates to refrigeration and more particularly to utilizing solar heat to supply energy to a heat operated refrigeration system.

I provide a continuous supply of heat in a solar operated heating system by storing water or other suitable fluid heated by the sun and utilizing this stored hot water to furnish heat to a refrigerator during period of no solar radiation.

Fig. 1 of the drawing shows more or less diagrammatically a refrigerator heating system embodying the invention. Fig. 2 is a section of the heat absorber shown in Fig. 1. A sun ray heat absorber 10 is shown for simplicity in the form of a semi-circular trough having a reflecting surface adapted to concentrate sun rays at one line along its length. In this line is positioned a portion of a conduit 11. One end of conduit 11 is connected to a conduit 12 which is connected to the upper part of an insulated storage tank 13. The other end of conduit 11 is connected to a conduit 14. One end of conduit 14 is connected to the bottom of the storage tank 13.

A refrigerator 15 is equipped with an absorption type refrigeration apparatus including a cooling element 16 in the refrigerator storage compartment 17 and a generator 18 in the apparatus compartment of the refrigerator. The refrigeration apparatus is only indicated generally as representative of a heat operated refrigerator. The apparatus may be like that described in U. S. Patent No. 2,037,782 of Wm. R. Hainsworth. In the generator 18 is a heating chamber 19. Conduit 12 is connected to one end of heating chamber 19 and conduit 14 is connected to the other end of heating chamber 19. In conduit 12 is a thermostatic water valve 20 having a sensitive bulb 21 in contact with the evaporator 16 so that operation of valve 20 is responsive to the temperature of evaporator 16.

The system including storage tank 13 and conduits 11, 12 and 14 is filled with water or other suitable heat conducting liquid. The storage tank 13 is thermally insulated.

During sunlight hours water in conduit 11 is heated by the sun ray heater 10. Heating of water in conduit 11 causes thermosyphon flow of water upward in conduit 11 and downward in conduit 14 from the bottom of tank 13 to the lower end of conduit 11. In this manner the tank 13 gradually becomes filled with hot water. When valve 20 is open, hot water from the top of tank 13 and upper end of conduit 11 also flows through conduit 12, heating chamber 19, and conduit 14 to the lower end of conduit 11. Valve 20 opens responsive to increase in temperature of refrigerator evaporator 16 and closes responsive to decrease in temperature of the evaporator. Hot water flowing through the generator heating chamber 19 supplies heat for operation of the refrigerator. Valve 20 controls this heat input responsive to a temperature condition affected by the evaporator 16.

During hours of darkness, meaning at night or when the sun's rays are otherwise obscured as on a cloudy day, water is not heated in conduit 11. During this time hot water flows from the upper part of tank 13 through conduit 12 under the control of valve 20 into the generator heating chamber 19 and then back to the tank 13 through conduit 14.

What is claimed is:

1. In the combination of a heat operated refrigerator and a solar heater, a thermal storage and transfer system comprising an insulated liquid storage tank, conduits forming a path for flow of liquid between the top and bottom of said storage tank having two parallel branches, the solar heater being arranged to heat liquid in one of said branches, the refrigerator being arranged to be operatively heated by liquid in the other of said branches, and means for controlling flow of liquid in said second branch responsive to an operating condition of said refrigerator.

2. A method of utilizing sunlight for heating a heat operated refrigerator which includes concentrating sun rays to heat liquid, utilizing some of the heated liquid to heat a heat operated refrigerator, re-heating the liquid thus utilized during sunlight hours, storing the remainder of the heated liquid during sunlight hours, and utilizing the stored liquid for heating the refrigerator during periods of darkness.

WILLIAM R. HAINSWORTH.